USU07933332B2

United States Patent
Schu et al.

(10) Patent No.: US 7,933,332 B2
(45) Date of Patent: Apr. 26, 2011

(54) METHOD AND DEVICE FOR DETERMINATION OF MOTION VECTORS THAT ARE COORDINATED WITH REGIONS OF AN IMAGE

(75) Inventors: Markus Schu, Erding (DE); Christian Tuschen, München (DE); Marko Hahn, Neubiberg (DE); Guido Kohlmeyer, Dortmund (DE)

(73) Assignee: Trident Microsystems (Far East) Ltd., Grand Cayman (KY)

( * ) Notice: Subject to any disclaimer, the term of this patent is extended or adjusted under 35 U.S.C. 154(b) by 1349 days.

(21) Appl. No.: 11/101,384

(22) Filed: Apr. 7, 2005

(65) Prior Publication Data
US 2005/0238101 A1 Oct. 27, 2005

(30) Foreign Application Priority Data
Apr. 7, 2004 (DE) .......................... 10 2004 017 145

(51) Int. Cl.
  *H04N 7/12* (2006.01)
  *H04N 5/14* (2006.01)
(52) U.S. Cl. .................................. 375/240.16; 348/699
(58) Field of Classification Search .................. 348/390,
  348/400, 409, 415.1, 416.1, 699, 700, 402,
  348/416, 424, 401, 408, 425, 412, 413, 415;
  382/232, 234, 236; 375/240, 240.01, 240.02,
  375/240.03, 240.12, 240.13, 240.14, 240.15,
  375/240.16, 240.17, 240.19, 240.26, 240.24
See application file for complete search history.

(56) References Cited

U.S. PATENT DOCUMENTS

| 5,148,269 | A | 9/1992 | de Haan et al. ................ 358/105 |
| 5,703,650 | A | 12/1997 | Robinson |
| 6,278,736 | B1* | 8/2001 | De Haan et al. ......... 375/240.16 |
| 6,438,170 | B1* | 8/2002 | Hackett et al. ............ 375/240.16 |
| 6,473,460 | B1* | 10/2002 | Topper ...................... 375/240.16 |
| 6,489,995 | B1* | 12/2002 | Kok et al. ................... 348/416.1 |
| 6,891,891 | B2* | 5/2005 | Pau et al. .................. 375/240.16 |
| 2005/0123039 | A1* | 6/2005 | Song et al. ................ 375/240.11 |

OTHER PUBLICATIONS

Blume, H., "Nonlinear error-tolerant interpolation of intermediate images," Fortschrittberichte VDI. 1997, Chapter 5.1.3, pp. 57-60.
Su, et al., "Motion Estimation Methods For Overlapped Block Motion Compensation," pp. 1509-1521, IEEE, 2000.

(Continued)

*Primary Examiner* — Behrooz Senfi
(74) *Attorney, Agent, or Firm* — DLA Piper LLP (US)

(57) ABSTRACT

In a method and device for determining motion vectors that are each coordinated with individual regions of an image, the image is divided into a number of first main blocks, making use of a first block raster, and a first estimation process is performed to provide each first block with a motion vector. The image is also divided into a number of second main blocks, making use of a second block raster, whose position is displaced relative to or offset from the first block raster, for example in the horizontal and vertical directions, and a second estimation process is performed to provide each second main block with a motion vector. A number of subblocks are formed, each subblock being formed by an overlap region between one of the main blocks of the first raster and certain ones of the second main blocks of the second raster. A motion vector for each subblock is generated, this motion vector depending on the motion vectors of the main blocks and being coordinated with the particular subblock.

15 Claims, 2 Drawing Sheets

OTHER PUBLICATIONS

Kuhn, "Algorithms, Complexity Analysis And VLSI Architectures For MPEG-4 Motion Estimation," pp. 18-25, Kluwer Academic Publishers, 1999.

Kuo, et al., "Fast Overlapped Block Motion Compensation With Checkerboard Block Partitioning," pp. 705-712, IEEE, 1998.

Kuo, et al., "Adaptive Overlapped Block Motion Compensation," pp. 401-411, SPIE, vol. 3164, 1997.

Heising, "Efficient Coding Of Motion Pictures By Using A Grid-based Prediction Over Time," pp. 1-2 (English Version—Abstract of Chapter 5 Only), pp. 1-15 (German language).

* cited by examiner

METHOD AND DEVICE FOR DETERMINATION OF MOTION VECTORS THAT ARE COORDINATED WITH REGIONS OF AN IMAGE

PRIORITY INFORMATION

This application claims priority from German application 10 2004 017 145.9-53, filed Apr. 7, 2004, which is hereby incorporated by reference.

BACKGROUND OF THE INVENTION

The invention relates to the field of video image processing, and in particular to the field of determining motion vectors that are each coordinated with individual regions in an image.

In image processing, it is known in the art to coordinate individual regions of an image in a sequence of images with motion vectors, each of which indicates a shifting in the position of an image region relative to a position of this same region in a preceding or succeeding image of the sequence. The motion information obtained in this way is useful, for example, in generating one or more intermediate images lying in time between the images of the sequence, to correctly represent the position of moving objects in the intermediate images, i.e., in a manner oriented to the motion. The motion information of an object or image region moving through several consecutive images can also be used for a compressed storage of image data of consecutive images.

One of several possible methods for generating such motion vectors is the block matching method, which is described, for example, in Blume, H., *Nonlinear error-tolerant interpolation of intermediate images*, Fortschrittberichte VDI, 1997, Chapter 5.1.3, pages 57-60. In this method, the current image of a sequence is divided into a number of blocks of equal size. For each of these blocks, a search is conducted in the preceding or following image for the block whose contents have the best match with the content of the particular block of the current image. The displacement vector between this block of the current image and the block of the preceding or following image having the best match with this block of the current image then forms the motion vector for this block of the current image.

In the full search algorithm, each block of the current image is compared to each block of the preceding or following image to determine the motion vectors of the individual regions. To reduce the considerable computational expense required in the full search algorithm, predictive estimating procedures are known, in which motion information from previous motion estimates is taken into account when determining the motion vector for a block.

The quality of the motion estimate with the block estimation method depends heavily on the block resolution, i.e., the size of the individual blocks. The quality is greater as the individual blocks are smaller, and thus as the resolution of the image into individual blocks is better and as more motion vectors are determined per image. On the other hand, the computational expense also increases as the block size becomes smaller. Also the error likelihood for wrong estimates is greater as the block sizes become smaller. Thus, it is believed that a useable block size is approximately 4 lines by 8 pixels. This size yields clearly distinguishable block structures during the image processing.

To enhance the resolution for determination of motion vectors, U.S. Pat. No. 5,148,269 teaches how to divide the image into a predetermined number of main blocks and perform a first block estimation, to coordinate each of these main blocks with a motion vector. Each individual main block is then divided into a number of subblocks, and each subblock is coordinated with a motion vector. To generate the motion vectors of the subblocks, the motion vector of the particular main block and the motion vectors of the other main blocks which adjoin the main block are utilized.

What is needed is a method and device for determination of motion vectors offering an enhanced resolution for a justifiable additional computational expense.

SUMMARY OF THE INVENTION

In a method for determining motion vectors that are each coordinated with individual regions of an image, the image is divided into a number of first main blocks, making use of a first block raster, and a first estimation process is performed to provide each first block with a motion vector. The image is also divided into a number of second main blocks, making use of a second block raster, whose position is displaced relative to or offset from the first block raster, for example in the horizontal and vertical directions, and a second estimation process is performed to provide each second main block with a motion vector, The image is further divided into a number of subblocks, each subblock being formed by an overlap region between one of the main blocks of the first raster and certain ones of the second main blocks of the second raster. A motion vector for each subblock is generated, this motion vector depending on the motion vectors of the main blocks coordinated with the particular subblock.

For the first and second estimation processes, any traditional block estimation methods may be used that are suitable for determination of motion vectors for individual regions of an image. Predictive block estimation methods may be used due to the smaller computational expense than full search methods.

An advantage of the method is that the use of just a single block estimation process with two block rasters offset from each other can increase the resolution of the method by a factor of four. That is, the size of the blocks having a motion vector at the end of the process is smaller by a factor of four than that of the main blocks for which block estimation procedures were performed. In general, the resolution of the vector field, i.e., the number of motion vectors determined per image, increases exponentially with the number of block estimation processes performed if a different raster is used for each block estimation process to subdivide the image into main blocks. On the other hand, the computational expense increases only approximately in linear manner with the number of block estimation processes carried out.

The dimensions of the main blocks formed by the first and second rasters may be equal.

The shifting of the second raster relative to the first raster is performed so that subblocks with the same dimensions are formed each time. In a method where two consecutive block estimation processes are carried out, using the first raster and a second raster shifted relative to the first raster means that the second raster is shifted in the horizontal direction by half the horizontal dimension of a main block relative to the first raster and that the second raster is shifted in the vertical direction by half the vertical dimension of a main block relative to the first raster.

To further enhance the resolution of the vector field, if n>2 rasters are divided to divide the image into equal-size main blocks, the individual rasters may be chosen such that the dimensions of the subblocks in the horizontal and vertical directions each time amount to 1/n of the dimensions of the main blocks in the horizontal and vertical directions.

The motion vector of a subblock may be formed using the motion vectors of the main blocks in whose overlap region the particular subblock is situated. This can be done in various ways, for example by selecting as the motion vector for the subblock one of the motion vectors of the main blocks coordinated with the subblock.

For the selection of the motion vector of a main block, a measure of quality may be used which is assigned to each motion vector during the estimation process. In block estimation methods for determining a motion vector for a region of a current image, the current image is compared to a region of a preceding or following image. In the comparison of the image regions, one may compare image information values such as luminance or chrominance values of the pixels of the regions being compared. This is done pixel by pixel, forming each time the differences of the image information values of the individual pixels located at identical positions of the image regions being compared. A measure of quality of the individual motion vectors may then be formed by the sum of the absolute values of all of these differences or the sum of the squares of all of these differences. The quality of the vector will be greater as this sum value is smaller. The motion vector for a subblock may then be the main block motion vector with the better measure of quality.

Further, the possibility also exists of assigning to the motion vector of a main block a measure of quality for each of the subblocks. This measure of quality can be found already during the block estimation process, by adding up the absolute values or squares of the image information values of the individual pixels, block by block, for the individual subblocks. The motion vector for a subblock in this case will be the motion vector of the main block that has the best measure of quality with respect to the particular subblock.

Another possibility is to determine the motion vector for a subblock by using a statistical ordered filter, such as a median filter, from the vectors of the main blocks, which span the subblock.

In the alternative, convergence criteria may be used for the motion vectors of the main blocks when coordinating one of these motion vectors with the subblocks. For example, a motion vector may be considered to be convergent if it deviates by less than a predetermined difference vector from the motion vector of an adjoining main block.

In one embodiment, one selects from at least two motion vectors coordinated with a subblock the one that is convergent. If several motion vectors are convergent, the measure of quality or filtering by means of an ordered statistical filter can be used as a further selection criterion.

A device for determining motion vectors that are each coordinated with individual regions of an image includes means for dividing the image into a number of first main blocks making use of a first block raster and means for performing a first estimation process to provide each first block with a motion vector. Also included are means for dividing the image into a number of second main blocks making use of a second block raster, whose position is shifted or offset relative to that of the first block raster, and means for performing a second estimation process to provide each second main block with a motion vector. The device further includes means for dividing the image into a number of subblocks, each of the subblocks being formed by an overlap region between one of the first main blocks and certain ones of the second main blocks of the second raster, and means for generating a motion vector for each subblock independently of the motion vectors of the main blocks coordinated with the particular subblock.

These and other objects, features and advantages of the present invention will become more apparent in light of the following detailed description of preferred embodiments thereof, as illustrated in the accompanying drawings.

DETAILED DESCRIPTION OF THE INVENTION

Figure 1:
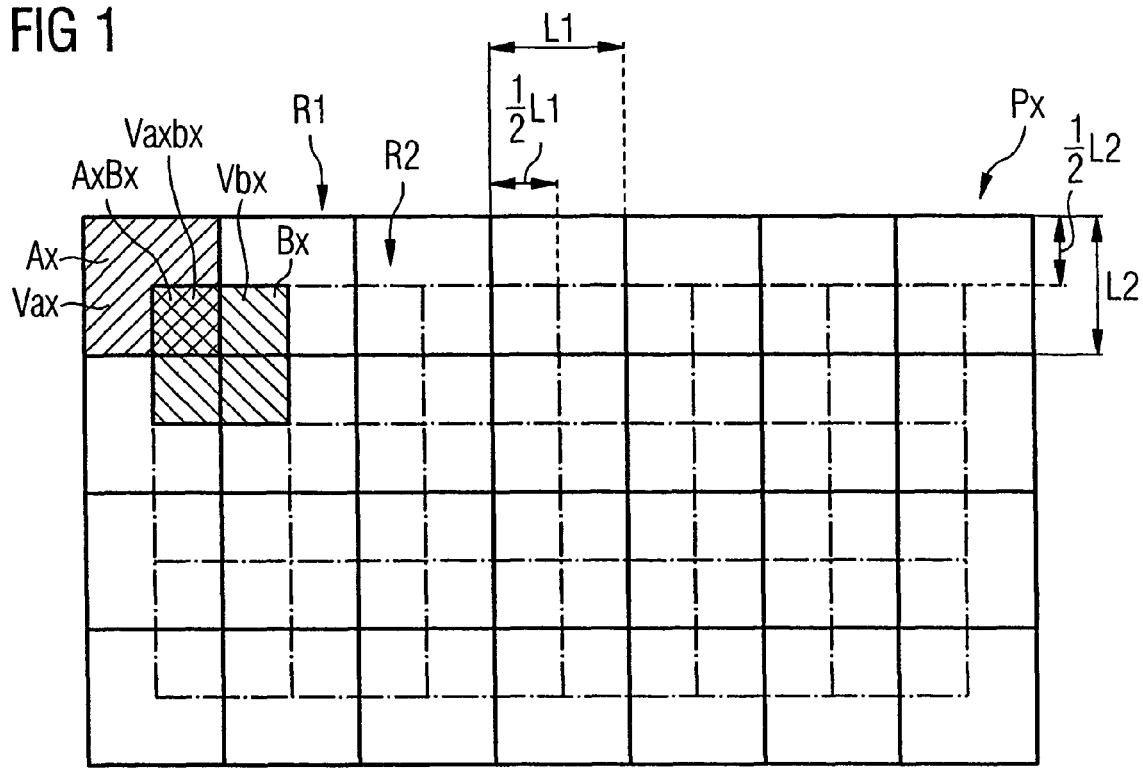
FIG. 1 illustrates an image divided into main blocks by using two rasters offset from each other.

Referring to FIG. 1, there illustrated is an image Px from a sequence containing a number of identically constructed images succeeding each other in time. The image Px is, for example, an image from a sequence of television or video images.

To perform motion estimation according to the method, the image Px is divided using a first raster R1 into a number of, e.g., equal-size, main blocks Ax, one of these being illustrated in dashed lines in FIG. 1. Each of these main blocks Ax of the first raster R1 is coordinated with a motion vector Vax. This motion vector Vax describes a displacement of the image content represented by the particular main block Ax relative to the position of a main block with the same image content in a preceding or following image of the sequence. Any block estimation method may be used for coordinating the motion vectors Vax with the individual main blocks Ax of the first raster R1.

The image Px is also divided using a second raster R2, whose position is shifted relative to or offset from the position of the first raster R1, into additional, e.g., equal-size, main blocks Bx, one of which is illustrated in dashed lines in FIG. 1. The dimensions of the main blocks Bx of the second raster R2 may correspond to the dimensions of the main blocks Ax of the first raster R1. Each of the main blocks Bx of the second raster B1 is coordinated with a motion vector Vbx.

Image regions in which one main block Ax of the first raster R1 and one main block Bx of the second raster R2 overlap form subblocks of the image Px. One such subblock, formed by overlapping of the shaded main block Ax of the first raster R1 and the shaded main block Bx of the second raster R2, is designated as AxBx in FIG. 1.

Each of these subblocks AxBx is coordinated with its own motion vector Vaxbx, which is dependent on the motion vectors Vax, Vbx of the main blocks Ax, Bx, respectively, that form the particular subblock AxBx. Because the rasters R1, R2 are offset from each other, the subblocks AxBx are each smaller than the main blocks Ax, Bx of the two rasters R1, R2, so that assigning a motion vector Vaxbx to each subblock AxBx produces an enhanced resolution of the motion estimation. The two rasters R1, R2 may be displaced relative to each other so that the individual subblocks are each the same size. Thus, when the main blocks Ax, Bx of the two rasters R1, R2 are the same size, the two rasters R1, R2 are shifted in a horizontal direction of the image by half the horizontal width L1 of a main block relative to each other, and in a vertical direction by half the vertical width L2 of a main block relative to each other.

There are various procedures for generating the motion vector Vaxbx of a subblock AxBx by means of the motion vectors Vax, Vbx of the main blocks Ax, Bx forming the subblock, as explained hereafter.

Figure 2:
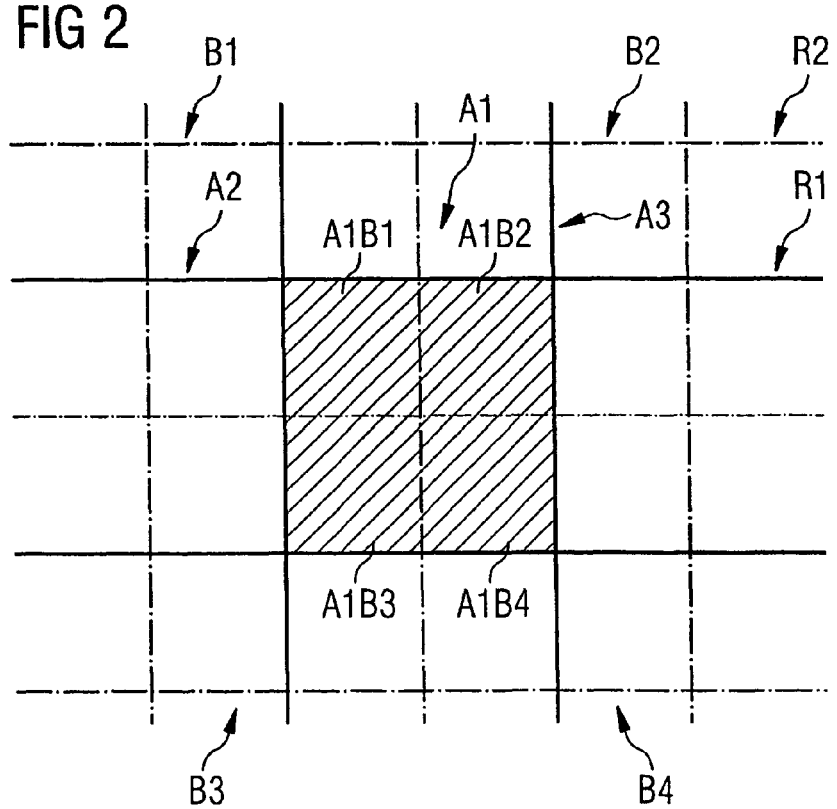
FIG. 2 illustrates an enlarged detail from the image of FIG. 1.

FIG. 2 illustrates a detailed segment of the image Px of FIG. 1 divided by the two block rasters R1, R2, with the rasters being offset from each other. The reference A1 denotes a main block formed by the first raster R1 and the references B1, B2, B3, and B4 each denote additional main blocks formed by the second raster R2. Each of the additional main blocks B1-B4 partly overlaps with the main block A1 of the first raster R1. The main block A1 is hereafter termed the first main block of the first raster R1 and the main blocks B1-B4 are hereafter termed the first to fourth main blocks of the second raster R2. The first main block A1 of the first raster R1 is assigned a first motion vector Va1, which may be determined by a block estimation method described above. Similarly, the first to fourth main blocks B1-B4 of the second raster R2 are assigned motion vectors Vb1-Vb4, which may be determined by the block estimation methods described above.

The first main block A1 of the first raster R1 is divided into four subblocks A1B1, A1B2, A1B3, A1B4. Each of these subblocks is formed by overlapping the first main block A1 with one of the first to fourth main blocks B1-B4 of the second raster R2. To increase the resolution of the motion estimate, each of these subblocks A1B1-A1B4 is assigned its own motion vector Va1b1-Va1b4, formed by using the motion vectors of the two main blocks which form the particular subblock. That is, the motion vector Va1b1 of the first subblock A1B1 is a function of the motion vector Va1 of the first main block A1 of the first raster R1 and the motion vector Vb1 of the first main block B1 of the second raster R2, thus:

$$Va1b1 = f(Va1, Vb1) \quad (1a)$$

The same holds for the motion vectors of the other three subblocks:

$$Va1b2 = f(Va1, Vb2) \quad (1b)$$

$$Va1b3 = f(Va1, Vb3) \quad (1c)$$

$$Va1b4 = f(Va1, Vb4) \quad (1d)$$

In one embodiment of the method, to generate the motion vectors of the subblocks one selects each time one of the motion vectors of the main blocks that form the particular subblock, thus:

$$Va1b1 = Va1 \text{ or } Vb1 \quad (2a)$$

$$Va1b2 = Va1 \text{ or } Vb2 \quad (2b)$$

$$Va1b3 = Va1 \text{ or } Vb3 \quad (2c)$$

$$Va1b4 = Va1 \text{ or } Vb4 \quad (2d)$$

When selecting one of the motion vectors of a main block, the possibility exists of assigning a measure of quality to each motion vector of a main block and selecting as the motion vector of the subblock the motion vector with the better measure of quality. The generating of such a measure of quality is explained hereafter by means of the first main block A1 of the first raster R1.

It is assumed that the main block A1 has m×n pixels, and that A1(x, y) denotes any one of the pixels A1(1, 1) to A1(m, n) forming the main block A1. A1$_{-Va1}$ denotes a main block of the first raster R1 in an image preceding in time or following in time the current image with the main block A1. The position of this main block A1$_{-Va1}$ in the preceding or following image is shifted by the motion vector Va1 relative to the position of the main block A1 of the current image. The displacement vector Va1 is assigned a measure of quality Ga1 by comparing the individual pixels A1(x, y) and A1$_{-Va1}$(x, y) with each other, pixel by pixel. For this, one forms the difference of these individual pixels, and the absolute values are summed up, so that:

$$Ga1 = \sum_{x=1}^{m} \sum_{y=1}^{n} |A1(x, y) - A1_{-Va1}(x, y)| \quad (3)$$

Instead of the absolute value difference, one can also sum up the squares of the pixel differences to form the measure of quality Ga1, so that:

$$Ga1 = \sum_{x=1}^{m} \sum_{y=1}^{n} [(A1(x, y) - A1_{-Va1}(x, y)]^2 \quad (4)$$

In either case, the quality of the motion vector Va1 is better as the quality value Ga1 is lower, and thus as the difference in the image content of the main block A1 and of the main block A1$_{-Va1}$ shifted by the motion vector Va1 is less.

Similarly to the generating of a measure of quality Ga1 for the first main block A1 of the first raster R1, quality values Gb1-Gb4 may be determined for the main blocks B1-B4 of the second raster R2. From the main blocks that form a subblock, the main block motion vector with the better quality value may be chosen as the motion vector of the subblock.

The quality values Ga1, Gb1 may usually be determined during the block estimation in the context of determining the motion vector assigned to a main block and thus these quality values may be taken straight from the block estimate.

In another embodiment, a measure of quality for each of the subblocks is assigned to each main block motion vector. With a view to the example in FIG. 2, four quality values are assigned to the motion vector Va1 of the first main block A1, namely, one quality value Ga1$_{B1}$ for the first subblock A1B1, a second quality value Ga1$_{B2}$ for the second subblock A1B2, a third quality value Ga1$_{B3}$ for the third subblock A1B3 and a fourth quality value Ga1$_{B4}$ for the fourth subblock A1B4. It is assumed that the subblocks A1B1-A1B4 each have i×j pixels. The individual quality values Ga1$_{B1}$-Ga1$_{B4}$ assigned to the subblocks A1B1-A1B4 are calculated as follows:

$$Ga1_{B1} = \sum_{x=1}^{i} \sum_{y=1}^{j} |A1(x, y) - A1_{-Va1}(x, y)| \quad (5a)$$

$$Ga1_{B2} = \sum_{x=1}^{i} \sum_{y=1}^{j} |A1(x+i, y) - A1_{-Va1}(x+i, y)| \quad (5b)$$

$$Ga1_{B3} = \sum_{x=1}^{i} \sum_{y=1}^{j} |A1(x, y+j) - A1_{-Va1}(x, y+j)| \quad (5c)$$

$$Ga1_{B4} = \sum_{x=1}^{i} \sum_{y=1}^{j} |A1(x+i, y+j) - A1_{-Va1}(x+i, y+j)| \quad (5d)$$

Instead of the absolute values of the individual pixel differences, following equation (4) one can also, generate the squares of the individual differences to generate the respective quality values.

Similarly to the generating of the quality value $Ga1_{B1}$ for the motion vector Va1 of the first main block A1 of the first raster R1, a corresponding quality value $Gb1_{A1}$ may be generated, which represents the quality value of the motion vector Vb1 of the first main block B1 of the second raster R2 for the first subblock A1B1. These two quality values are compared to each other, and the motion vector with the better measure of quality as the motion vector for this first subblock A1B1 is used. When determining the measures of quality for the main blocks in accordance with equations (5a)-(5d), the motion vector whose measure of quality has the smallest absolute value counts may be deemed to be the better one.

Besides quality measures, it is also possible to use convergence criteria when selecting the main block motion vectors assigned to a subblock. The motion vector of a main block is considered convergent if the absolute value of a difference vector between this main block motion vector and an adjoining main block motion vector is less than a given limit value. To illustrate, consider the motion vector Va1 of the first main block A1 of the first raster R1 and a motion vector Va2 of a main block A2 adjoining the first main block A1. The motion vector Va1 of the first main block is considered convergent if:

$$|Va1-Va2|<\Delta_{max} \tag{6}$$

Two adjoining main blocks may be considered to judge the convergence of a motion vector of a main block. For the main blocks of the first raster R1, one may consider the horizontally adjacent main block in front of the direction of processing and also the main block lying above and already vertically processed, so that the motion vector Va1 is considered convergent if the following conditions are fulfilled:

$$|Va1-Va2|<\Delta_{max} \tag{7a}$$

$$|Va1-Va3|<\Delta_{max} \tag{7b}$$

Where Va3 denotes the motion vector of the main block A3 lying above the main block A1 in FIG. 2.

To assess the convergence of the motion vector of a main block of the second raster R2, one may consider the main block lying to the right next to the particular main block and the main block lying beneath this main block. Thus, for example, the motion vector Vb1 of the first main block B1 of the second raster R2 is considered convergent if:

$$|Vb1-Vb2|<\Delta_{max} \tag{8a}$$

$$|Vb1-Vb3|<\Delta_{max} \tag{8b}$$

If only one of two main block motion vectors assigned to a subblock is convergent, the converged main block motion vector is chosen as the motion vector for the particular subblock. If both main block motion vectors have converged, the measure of quality discussed above, for example, may be used as a further criterion of choice, to select one of the main block motion vectors.

Figure 3:
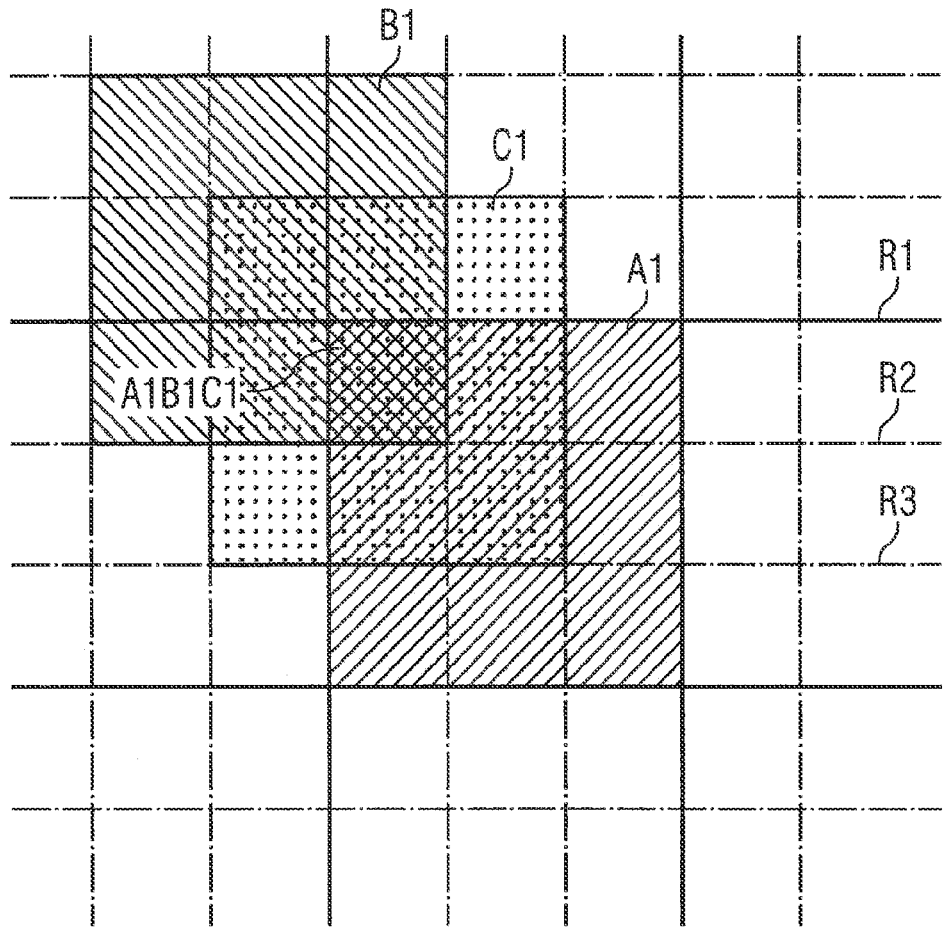
FIG. 3 illustrates a segment of a block divided into main blocks using three block rasters.

The method is not limited to the use of only two rasters spatially offset from each other. FIG. 3 illustrates an image segment divided into main blocks using three rasters R1, R2, R3 spatially offset from each other. A1 denotes a main block of the first raster R1, B1 denotes a main block of the second raster R2, and C1 denotes a main block of the third raster R3. These three main blocks A1, B1, C1 overlap in a region forming a subblock A1B1C1, to which a motion vector is assigned which is dependent on the motion vectors Va1, Vb1, Vc1 of the three main blocks.

In the method, if one uses n rasters spatially offset from each other, being arranged with such an offset from each other such that subblocks of equal size are formed, the resolution of the vector field is increased by a factor of $2^n$ as compared to the resolution of the vector field when using only one raster. The expense of determining the motion vectors for the individual subblocks essentially increases only by a factor of n, since most of the computational expense is used in determining the motion vectors of the main blocks. After determining the motion vectors of these main blocks, the remaining computational expense to select one of the main block motion vectors assigned to a subblock as the motion vector for this subblock is relatively small. The motion estimation to determine the motion vectors of the main blocks can be done in parallel or consecutively.

To generate the motion vector Va1b1c1 of the subblock A1B1C1 using the motion vectors Va1, Vb1, Vc1 of the main blocks A1, B1, C1 forming this subblock A1B1C1, one may also use filtering by an ordered statistical filter. An example of this is a median filter. The motion vector being generated for the subblock Va1b1c1 and the motion vectors Va1, Vb1, Vc1 of the main blocks A1, B1, C1 each comprise one horizontal and one vertical component, hereinafter called the x-and y-components of the vectors.

In an exemplary method for generating the subvector, the main block motion vectors Va1, Vb1, Vc1 undergo a filtering, component by component, by an ordered statistical filter, and the filter outcome is assigned to the respective component of the subvector. When using a median filter, the resulting motion vectors are defined by:

$$Va1b1c1_x = \mathrm{Median}(Va1_x, Vb1_x, Vc1_x) \tag{9a}$$

$$Va1b1c1_y = \mathrm{Median}(Va1_y, Vb1_y, Vc1_y) \tag{9b}$$

where the subscripts x and y denote the x and y components of the particular vectors.

Depending on the outcome of the filtering, the subblock motion vector $Va1b1c1=(Va1b1c1_x, Va1b1c1_y)$ in this method can be composed of components of different main block motion vectors.

In another method, the vector absolute values of the main block motion vectors Va1, Vb1, Vc1 undergo a median filtering and the main block motion vector chosen as the subblock motion vector is the one whose absolute value is output as the result of the filtering.

Figure 4:
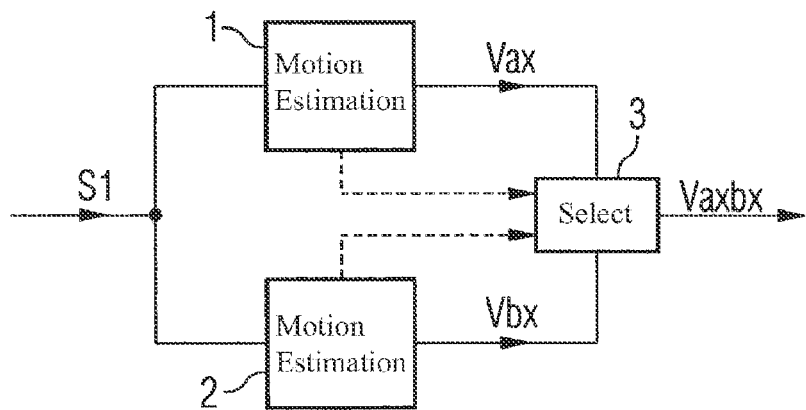
FIG. 4 is a block diagram of a device for determining motion vectors.

Referring to FIG. 4, there illustrated is a device for determining motion vectors Vaxbx for subblocks, in which the motion estimation to generate the motion vectors of the main blocks is performed in parallel. The device has an input for entering a video signal S1, which represents consecutive images of an image sequence. The device has a first motion estimation device 1, which provides first main block motion vectors Ax by using a first raster R1. The device also has a second motion estimation device 2, which provides a group of second main block motion vectors for main blocks of an image by using a second raster R2. These main block motion vectors Vax, Vbx are sent to a selection unit 3, which selects one motion vector Vaxbx for each for the subblocks from among the motion vectors of the main blocks that form the respective subblock. As the criteria for selection, the selection unit 3 uses, for example, quality measures and/or convergence criteria of the main block motion vectors, which are sent to the selection unit 3 from the motion estimation devices 1, 2.

Although the present invention has been shown and described with respect to several preferred embodiments thereof, various changes, omissions and additions to the form and detail thereof, may be made therein, without departing from the spirit and scope of the invention.

What is claimed is:

1. A method for determining motion vectors that are coordinated with individual image regions of an image, comprising:
dividing the image into a number of first main blocks using a first block raster and performing a first estimation process to provide a motion vector for each of the first main blocks;
dividing the image into a number of second main blocks using at least one second block raster, a position of the at least one second block raster being shifted relative to a position of the first block raster, and performing a second estimation process to provide a motion vector for each of the second main blocks;
forming a number of subblocks, each of the subblocks being formed by an intersection, region between one of the first main blocks and at least one of the second main blocks; and
generating a motion vector for each subblock as a function of the estimated motion vectors of the first and second main blocks whose intersection forms that subblock, each of the generated motion vectors for the subblocks being coordinated with the particular subblock;
where the dividing the image into the number of first main blocks, the dividing the image into the number of second main blocks, the forming a number of subblocks, and the generating the motion vector are performed by a video image processing device.

2. The method of claim 1, where the dimensions of the first and second main blocks are equal.

3. The method of claim 2, where the position of the second raster relative to the position of the first raster in the horizontal direction of the image constitutes half of the dimension of the main blocks in the horizontal direction and where the position of the second raster relative to the position of the first raster in the vertical direction of the image constitutes half of the dimension of the main blocks in the vertical direction.

4. The method of claim 1, where the step of generating a motion vector for each subblock selects the motion vector of one of the main blocks that is part of the overlap intersection, region used to form a subblock as the motion vector of the subblock.

5. The method of claim 4, further comprising the step of determining a measure of quality for each one of the motion vectors of the main blocks, where the step of generating the motion vector for each subblock selects the motion vector of one of the main blocks as the motion vector for the subblock depending on the determined main block motion vector quality measure.

6. The method claim 5, further comprising the step of determining a measure of quality for the motion vector of each one of the subblocks, where the step of generating a motion vector for each subblock selects the motion vector of one of the main blocks as the motion vector of the subblock depending on the determined subblock motion vector quality measure.

7. The method of claim 4, further comprising the step of determining at least one convergence criterion for each one of the motion vectors of the main blocks, where the step of generating a motion vector for each subblock selects the motion vector of one of the main blocks as the motion vector for the subblock depending on the at least one determined convergence criterion.

8. The method of claim 7, where the step of determining at least one convergence criterion compares the motion vector of a first one of the main blocks to at least one motion vector of a second one of the main blocks that is adjoining the first main block and is in the same raster as the raster of the first one of the main blocks.

9. The method of claim 7, where the step of determining at least one convergence criterion determines at least one convergence criterion for one of the main blocks of the first raster by comparing the motion vector of the one main block of the first raster to the motion vector of a second main block adjoining the left side of the one main block and to the motion vector of a third main block adjoining the top of the one main block, and where the step of determining at least one convergence criterion determines at least one convergence criterion for one of the main blocks of the second raster by comparing the motion vector of the one main block of the second raster to the motion vector of a second main block adjoining the right side of the one main block and to the motion vector of a third main block adjoining the bottom of the one main block.

10. The method of claim 1, further comprising the step of filtering to select vector components of the motion vector of the subblock from corresponding vector components of the motion vectors of the main blocks that are coordinated with the subblock.

11. The method of claim 10, where the step of filtering comprises the step of filtering by an ordered Statistical filter.

12. The method of claim 4, further comprising the steps of:
forming the vector absolute values of the motion vectors of the main blocks coordinated with the subblock;
filtering the vector absolute values to provide one of the vector absolute values as a filter;
selecting as the motion vector of the subblock the motion vector of the main block whose vector absolute value was provided as the filter output.

13. The method of claim 12, where the step of filtering comprises the step of filtering by an ordered Statistical filter.

14. A device for determining motion vectors that are coordinated with individual regions of an image, comprising:
means for dividing the image into a number of first main blocks using a first block raster and means for performing a first estimation process to provide a motion vector for each of the first main blocks;
means for dividing the image into a number of second main blocks using at least one second block raster, a position of the at least one second block raster being shifted relative to a position of the first block raster, and means for performing a second estimation process to provide a motion vector for each of the second main blocks;
means for forming a number of subblocks, wherein each of the subblocks is formed by an intersection region between one of the first main blocks and at least one of the second main blocks; and
means for generating a motion vector for each subblock as a function of the estimated motion vectors of the first and second main blocks whose intersection forms that subblock, each of the generated motion vectors being coordinated with the particular subblock.

15. A method for determining motion vectors that are coordinated with individual image regions of an image, comprising:
dividing the image into a number of first main blocks using a first block raster and performing a first estimation process to provide a motion vector for each of the first main blocks;
dividing the image into a number of second main blocks using at least one second block raster, a position of the at least one second block raster being shifted relative to a position of the first block raster, and performing a second estimation process to provide a motion vector for each of the second main blocks;

dividing the image into a number of second main blocks using at least one second block raster, a position of the at least one second block raster being shifted relative to a position of the first block raster, and performing a second estimation process to provide a motion vector for each of the second main blocks;

dividing the image into a number of third main blocks using at least one third block raster, a position of the at least one third block raster being shifted relative to the position of the first block raster and further being shifted relative the position of the second block raster, and performing a third estimation process to provide a motion vector for each of the third main blocks;

forming a number of subblocks, each of the subblocks being formed by an intersection, region between one of the first main blocks, at least one of the second main blocks, and at least one of the third main blocks; and generating a motion vector for each subblock as a function of the estimated motion vectors of the first, second, and third main blocks whose intersection forms that subblock, each of the generated motion vectors for the subblocks being coordinated with the particular subblock;

where the dividing the image into the number of first main blocks, the dividing the image into the number of second main blocks, the dividing the image into the number of third main blocks, the forming a number of subblocks, and the generating the motion vector are performed by a video image processing device.

* * * * *